US010403416B2

(12) United States Patent
Sato

(10) Patent No.: US 10,403,416 B2
(45) Date of Patent: Sep. 3, 2019

(54) CONDUCTIVE POLYPROPYLENE-BASED FOAMED RESIN PARTICLES, METHOD FOR PRODUCTION THEREOF, AND POLYPROPYLENE-BASED FOAMED MOLDING ARTICLE

(71) Applicant: Kaneka Corporation, Osaka (JP)

(72) Inventor: Keishi Sato, Osaka (JP)

(73) Assignee: KANEKA CORPORATION, Osaka (JP)

(*) Notice: Subject to any disclaimer, the term of this patent is extended or adjusted under 35 U.S.C. 154(b) by 0 days.

(21) Appl. No.: 15/438,203

(22) Filed: Feb. 21, 2017

(65) Prior Publication Data

US 2017/0162292 A1 Jun. 8, 2017

Related U.S. Application Data

(63) Continuation of application No. PCT/JP2015/073587, filed on Aug. 21, 2015.

(30) Foreign Application Priority Data

Aug. 21, 2014 (JP) .................. 2014-168827

(51) Int. Cl.
*H01B 1/24* (2006.01)
*C08J 9/00* (2006.01)
(Continued)

(52) U.S. Cl.
CPC .............. *H01B 1/24* (2013.01); *C08J 9/0023* (2013.01); *C08J 9/0028* (2013.01); *C08J 9/0061* (2013.01);
(Continued)

(58) Field of Classification Search
CPC ........... H01B 1/24; C08J 9/18; C08J 2323/14; C08K 3/04; C08K 2201/001
(Continued)

(56) References Cited

U.S. PATENT DOCUMENTS

2014/0346411 A1* 11/2014 Miura .................. C08J 9/16
252/511

FOREIGN PATENT DOCUMENTS

JP H0275636 A 3/1990
JP H09202837 A 8/1997
(Continued)

OTHER PUBLICATIONS

International Search Report issued in corresponding International Application No. PCT/JP2015/073587 with English Translation dated Nov. 24, 2015 (5 pages).

*Primary Examiner* — Harold Y Pyon
*Assistant Examiner* — Danny N Kang
(74) *Attorney, Agent, or Firm* — Osha Liang LLP

(57) ABSTRACT

Conductive polypropylene-based foamed resin particles foamed particles includes a resin composition containing 100 parts by weight of a polypropylene-based resin, 17.6 parts by weight to 33.4 parts by weight of conductive carbon black, and 0.1 parts by weight to 3.0 parts by weight of a water-soluble organic substance. The resin composition has a melting point (Tm) of 145° C. to 155° C., as measured by a differential scanning calorimetry (DSC) method, and has a temperature difference (ΔT) of 50° C. or more between the melting point (Tm) and a crystal melting start temperature (Tl) in a DSC differential scanning calorimetry (DSC) curve.

7 Claims, 1 Drawing Sheet

(51) Int. Cl.
  *C08J 9/18* (2006.01)
  *C08L 23/10* (2006.01)
  *C08J 9/232* (2006.01)
  *C08J 9/12* (2006.01)
  *C08J 9/14* (2006.01)

(52) U.S. Cl.
  CPC .............. *C08J 9/0066* (2013.01); *C08J 9/18* (2013.01); *C08J 9/232* (2013.01); *C08L 23/10* (2013.01); *C08J 9/122* (2013.01); *C08J 9/141* (2013.01); *C08J 2201/034* (2013.01); *C08J 2203/06* (2013.01); *C08J 2203/142* (2013.01); *C08J 2323/10* (2013.01); *C08J 2323/14* (2013.01); *C08J 2471/02* (2013.01)

(58) Field of Classification Search
  USPC ........................................................ 252/500
  See application file for complete search history.

(56) References Cited

FOREIGN PATENT DOCUMENTS

| | | | |
|---|---|---|---|
| JP | 2004175819 A | | 6/2004 |
| JP | 2006232939 A | | 9/2006 |
| JP | 2013144733 A | * | 7/2013 |
| WO | 2013094529 A1 | | 6/2013 |

* cited by examiner

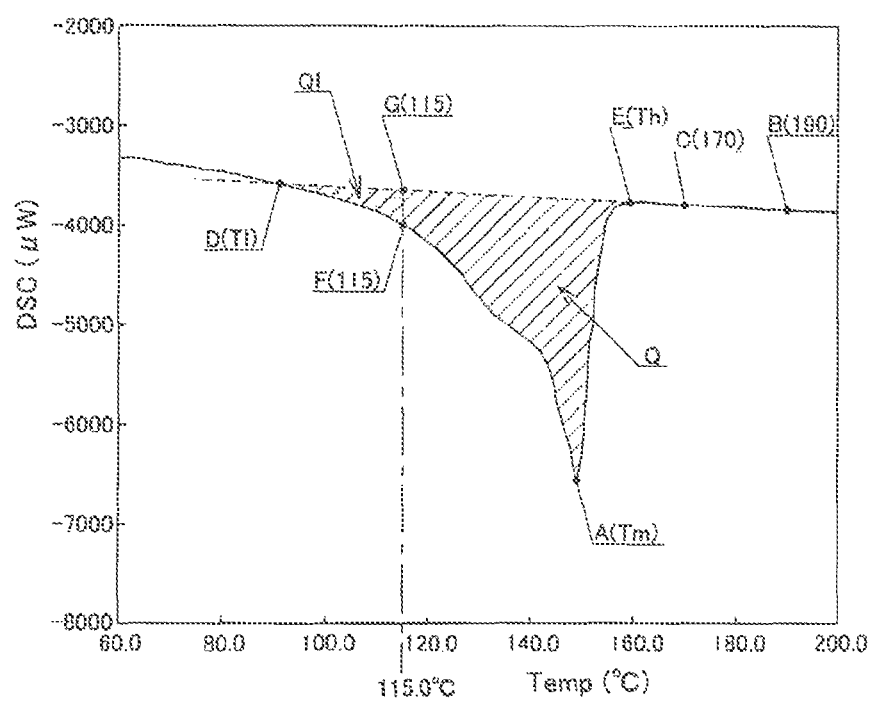

CONDUCTIVE POLYPROPYLENE-BASED FOAMED RESIN PARTICLES, METHOD FOR PRODUCTION THEREOF, AND POLYPROPYLENE-BASED FOAMED MOLDING ARTICLE

TECHNICAL FIELD

One or more embodiments of the present invention relate to conductive polypropylene-based foamed resin particles, a method for producing polypropylene-based foamed resin particles, and a polypropylene-based foamed molding article.

BACKGROUND

Molded articles made from polyolefin-based foamed resin particles are used for a wide variety of applications such as cushioning materials and packaging materials. In recent years, such molded articles have been required to have antistatic properties or electrical conductivity for use as packaging or shipping materials for electronic components such as semiconductors.

A method for imparting antistatic properties or electrical conductivity to molded articles includes adding a conductive material into foamed resin particles as raw materials for the production of the molded articles. Known examples of such conductive polyolefin-based foamed resin particles include conductive polyolefin-based foamed resin particles containing conductive carbon black dispersed therein.

A large amount of conductive carbon black is necessary for high electrical conductivity. However, a polypropylene-based resin has high crystallinity. If the large amount of conductive carbon black is dispersed in such a polypropylene-based resin, bubbles (hereinafter called "cells") in the polypropylene-based resin are caused to be extremely fine due to the high crystallinity of the polypropylene-based resin. This causes the resulting foamed particles to easily decrease in internal pressure. This reduces the foaming power and makes the molding very difficult (due to shrinkage of molded articles, formation of surface wrinkles, and other defects), which means that it is difficult to obtain polypropylene-based foamed resin particles with excellent physical properties.

Previously, a method of foaming foamable resin particles produced by impregnating, with a foaming agent, polypropylene-based resin particles containing a carboxyl group-containing polypropylene-based resin as a base material, conductive carbon black, and a bubble nucleus; and a method of foaming foamable resin particles produced by impregnating, with a foaming agent, polypropylene-based resin particles containing conductive carbon and a water-soluble inorganic substance were proposed (Patent Literature 1).

Unfortunately, in molded articles containing a large amount of conductive carbon black, the conductive carbon black can easily drop off from the molded articles and easily cause contamination on products packaged therein. The foamed resin particles obtained by foaming the foamable resin particles containing conductive carbon black, and a bubble nucleus or a water-soluble inorganic substance still have fine cells and poor moldability. Therefore, foamed molding articles obtained from the foamed resin particles do not have a satisfactory level of surface appearance, expansion, color uniformity, or other properties.

It is further disclosed that even when containing a large amount of conductive carbon black, polypropylene-based resin particles of a polypropylene-based resin composition containing a polypropylene-based resin and a certain amount of a bubble size enlarging agent such as polyethylene glycol or glycerin can be foamed to form a product having large and uniform cells and improved flame retardancy (Patent Literature 2). However, the technique disclosed in Patent Literature 2 still has room for improvement in preventing the dropping off of conductive carbon black.

CITATIONS LIST

Patent Literatures

Patent Literature 1: Japanese Unexamined Patent Application Publication No. 09-202837
Patent Literature 2: PCT International Publication No. WO 2013/094529

SUMMARY

One or more embodiments of the present invention is to provide conductive polypropylene-based foamed resin particles having excellent moldability and containing conductive carbon black in such a manner that the carbon black resists dropping off and thus is less likely to cause contamination.

The inventor has found that when a polypropylene-based resin composition described below is used as a base resin to form conductive polypropylene-based foamed resin particles, the resulting conductive polypropylene-based foamed resin particles can (i) contain the conductive carbon black and the polypropylene-based resin which have higher compatibility with each other, (ii) keep the conductive carbon black from dropping off, (iii) have large and uniform cells, and (iv) have good moldability. The polypropylene-based resin composition contains 100 parts by weight of a polypropylene-based resin, 17.6 parts by weight or more and less than 33.4 parts by weight of conductive carbon black, and 0.1 parts by weight or more and 3.0 parts by weight or less of a water-soluble organic substance, having a melting point Tm of 145° C. or more and 155° C. or less as measured by a differential scanning calorimetry (DSC) method, and having a temperature difference ΔT of 50° C. or more between the melting point Tm and the crystal melting start temperature T1 in the DSC curve.

Thus, one or more embodiments of the present invention provide the following.

[1] Conductive polypropylene-based foamed resin particles containing:
a resin composition containing 100 parts by weight of a polypropylene-based resin, 17.6 parts by weight or more and less than 33.4 parts by weight of conductive carbon black, and 0.1 parts by weight or more and 3.0 parts by weight or less of a water-soluble organic substance, having a melting point Tm of 145° C. or more and 155° C. or less as measured by a DSC method, and having a temperature difference ΔT of 50° C. or more between the melting point Tm and a crystal melting start temperature T1 in a DSC curve.

[2] The conductive polypropylene-based foamed resin particles according to item [1], wherein as measured by the DSC method, the resin composition has properties indicated by a DSC curve in which an endothermic area in a range of 115° C. or less occupies 5% or more and less than 10% of the total endothermic peak calorific area Q.

[3] The conductive polypropylene-based foamed resin particles according to item [1] or [2], wherein the water-soluble organic substance is polyethylene glycol.

[4] The conductive polypropylene-based foamed resin particles according to item [1] or [2], wherein the water-soluble organic substance is melamine.

[5] The conductive polypropylene-based foamed resin particles according to item [1] or [2], wherein the water-soluble organic substance is stearyl diethanolamine.

[6] A conductive polypropylene-based resin in-mold shamed molding article including the conductive polypropylene-based foamed resin particles according to any one of items [1] to [5].

[7] A method for producing conductive polypropylene-based foamed resin particles, the method including a first-step foaming process including:

placing polypropylene-based resin particles, water, and a foaming agent in a pressure-resistant container to form a dispersion under stirring conditions;

heating the dispersion to a temperature equal to or higher than the softening point of the polypropylene-based resin particles; and then discharging the dispersion from the pressure-resistant container to a region at a pressure lower than the internal pressure in the pressure-resistant container to foam the polypropylene-based resin particles, wherein the polypropylene-based resin particles are conductive polypropylene-based resin particles containing a resin composition that contains 100 parts by weight of a polypropylene-based resin, 17.6 parts by weight or more and less than 33.4 parts by weight of conductive carbon black, and 0.1 parts by weight or more and 3.0 parts by weight or less of a water-soluble organic substance, has a melting point Tm of 145° C. or more and 155° C. or less as measured by a DSC method, and has a temperature difference ΔT of 50° C. or more between the melting point Tm and a crystal melting start temperature Tl in a DSC curve.

[8] The method according to item [7], including a second step foaming process including:

applying an internal pressure, by pressurization, to the conductive polypropylene-based foamed resin particles obtained by the first-step foaming process; and then further expanding the conductive polypropylene-based foamed resin particles by heating with steam.

This step is also called as 'secondary expansion process', and the foamed particles are also called as 'secondary expanded particles'.

One or more embodiments of the present invention make it possible to obtain conductive polypropylene-based foamed resin particles that (i) contain conductive carbon black and a polypropylene-based resin having higher compatibility with each other, (ii) keep the conductive carbon black from dropping off, (iii) have large and uniform cells, and (iv) have good moldability.

One or more embodiments of the present invention makes it possible to obtain conductive polypropylene-based foamed resin particles that resist the decrease in internal pressure, have high foaming power, and have superior moldability.

BRIEF DESCRIPTION OF DRAWING

FIG. 1 is a graph showing an example of the endothermic curve (DSC curve) of a polypropylene-based resin composition for use in one or more embodiments of the present invention, which is obtained by differential scanning calorimetry (DSC) in which the resin composition is melted by heating at a temperature increase rate of 10° C./minute from 40° C. to 220° C., then crystallized by cooling at a temperature decrease rate of 10° C./minute from 220° C. to 40° C., and then heated at a temperature increase rate of 10° C./minute from 40° C. to 220° C. The horizontal axis represents temperature, and the vertical axis represents endothermic amount. A straight line is obtained as a base line by extending the line BC, in which B and C are the 190° C. point and the 170° C. point, respectively, on the DSC curve having a peak A. In the graph, of the intersection points between the base line and the DSC curve, the low temperature-side point is designated as D, and the high temperature-side point is designated as E. The crystal melting start temperature Tl is defined as the temperature at the low temperature-side point D.

DESCRIPTION OF EMBODIMENTS

The conductive polypropylene-based foamed resin particles in one or more embodiments of the present invention are foamed particles obtained by foaming conductive polypropylene-based resin particles containing a polypropylene-based resin composition as a base resin, in which the polypropylene-based resin composition contains 100 parts by weight of a polypropylene-based resin, 17.6 parts by weight or more and less than 33.4 parts by weight of conductive carbon black, and 0.1 parts by weight or more and 3.0 parts by weight or less of a water-soluble organic substance, has a melting point Tm of 145° C. or more and 155° C. or less as measured by a DSC method, and has a temperature difference ΔT of 50° C. or more between the melting point Tm and the crystal melting start temperature Tl in the DSC curve.

The polypropylene-based resin used in one or more embodiments of the present invention may be of any type, such as a polypropylene homopolymer, an ethylene-propylene random copolymer, a butene-1-propylene random copolymer, an ethylene-butene-1-propylene random copolymer, an ethylene-propylene block copolymer, a butene-1-propylene block copolymer, a propylene-chlorinated vinyl copolymer, or a propylene-maleic anhydride copolymer. Among them, an ethylene-propylene random copolymer and an ethylene-butene-1-propylene random copolymer may be because they have good foamability and good moldability.

When used in one or more embodiments of the present invention, the ethylene-propylene random copolymer or the ethylene-butene-1-propylene random copolymer may have an ethylene content of 0.2% by weight to 10% by weight based on 100% by weight of each copolymer.

The melt index (hereinafter referred to as "MI") of the polypropylene-based resin used in one or more embodiments of the present invention may be, but is not limited to, 3 g/10 minutes to 30 g/10 minutes, such as 4 g/10 minutes to 20 g/10 minutes, or such as 5 g/10 minutes to 18 g/10 minutes.

If the polypropylene-based resin has an MI of less than 3 g/10 minutes, there may be a tendency to make it difficult to increase the expansion ratio. If the polypropylene-based resin has an MI of more than 30 g/10 minutes, the resulting polypropylene-based foamed resin particles can have open cells, which will tend to reduce the compressive strength of the polypropylene-based resin in-mold foamed molding article or to degrade the surface appearance.

In this regard, the MI value is the value measured under the conditions of 2,160 g load and 230±0.2° C. according to JIS K 7210.

The polypropylene-based resin used in one or more embodiments of the present invention may be synthesized using any type of polymerization catalyst, such as a Ziegler's catalyst or a metallocene catalyst.

The polypropylene-based resin used in one or more embodiments of the present invention may have any melting point. In view of the melting point of the polypropylene-based resin composition containing the conductive carbon black and the water-soluble organic substance described below, the polypropylene-based resin used in one or more embodiments of the present invention may have a melting point of 140° C. to 160° C., such as 145° C. to 155° C. A method for controlling the melting point of the polypropylene-based resin in the range of 140° C. to 160° C. may include controlling the content of the comonomer used for the polypropylene-based resin. For example, the polypropylene-based resin may have a comonomer content of 1% by weight to less than 10% by weight, such as 3% by weight to less than 8% by weight.

Examples of the comonomer include, but are not limited to, olefins such as ethylene, propylene, 1-butene, and isobutene.

In one or more embodiments of the present invention, the polypropylene-based resin composition containing a water-soluble organic substance may have a melting point Tm of 145° C. to 155° C. If the composition has a melting point of less than 145° C., the carbon black can significantly drop off from the in-mold foamed molding articles obtained from first-step foamed particles and secondary expanded particles. If the composition has a melting point of more than 155° C., the composition can have too high a degree of crystallinity, which may impair the moldability and easily cause the carbon black to drop off.

In addition, the difference ΔT between the melting point and the crystal melting start temperature may be 50° C. or more. If the difference ΔT is less than 50° C., the in-mold foamed molding article will tend to have a lower level of physical properties such as compressive strength and dimensional stability, and it will be difficult to obtain the effect of preventing the carbon black from dropping off.

In addition, when the polypropylene-based resin composition is measured by DSC, the rate of occupancy of the endothermic area Ql in the range of not higher than 115° C. may be from 5% to less than 10% of the total endothermic peak calorific area Q by. If the occupancy rate is less than 5%, the in-mold foamed molding will tend to produce foamed particles with lower foaming power. If the occupancy rate is more than 10%, the in-mold foamed product will tend to have a lower level of physical properties such as compressive strength.

The conductive carbon black used in one or more embodiments of the present invention may be of any type, such as acetylene black and furnace black. These materials may be used alone or in mixture of two or more.

The content of the conductive carbon black in the polypropylene-based resin composition used in one or more embodiments of the present invention may be 17.6 parts by weight to 33.4 parts by weight based on 100 parts by weight of the polypropylene-based resin.

If the conductive carbon black content is less than 17.6 parts by weight, a sufficient level of conducting performance will fail to be obtained. If the conductive carbon black content is more than 33.4 parts by weight, cells will tend to break down during the foaming or the foamability will tend to decrease significantly. The use of the polypropylene-based resin composition according to one or more embodiments of the present invention make it possible to significantly prevent the dropping off of the conductive carbon black, which would otherwise easily drop off in the conventional art when added in a large amount of 17.6 parts by weight or more and less than 33.4 parts by weight.

In one or more embodiments of the present invention, the polypropylene-based resin composition having a melting point TM of 145° C. or more and 155° C. or less contains a water-soluble organic substance. This makes it possible to suppress the dropping off of the conductive carbon black and to form large and uniform cells so that the resulting conductive polypropylene-based foamed resin particles can have good moldability. On the other hand, if a water-soluble inorganic substance is used, the carbon black can significantly drop off.

The water solubility of the water-soluble organic substance refers to the ability to be uniformly dispersed and dissolved in water, which is due to its strongly hydrophilic functional group in the molecular structure. Empirically, organic substances having one hydrophilic group per five carbon atoms often exhibit water solubility.

Specific examples of the water-soluble organic substance include polyalkylene glycol chain-containing compounds such as polypropylene glycol and polyethylene glycol; triazine skeleton-containing compounds such as melamine (chemical name: 1,3,5-triazine-2,4,6-triamine), ammeline (chemical name: 1,3,5-triazine-2-hydroxy-4,6-diamine), ammelide (chemical name: 1,3,5-triazine-2,4-hydroxy-6-amine), cyanuric acid (chemical name: 1,3,5-triazine-2,4,6-triol), isocyanuric acid (chemical name: 1,3,5-triazine-2,4,6 (1H,3H,5H)-trione), acetoguanamine (chemical name: 1,3,5-triazine-2,4-diamine-6-methyl), benzoguanamine (chemical name: 1,3,5-triazine-2,4-diamine-6-phenyl), tris(methyl)isocyanurate, tris(ethyl)isocyanurate, tris(butyl)isocyanurate, tris(2-hydroxyethyl)isocyanurate, and melamine-isocyanuric acid condensates; cationic surfactants such as aliphatic amine salts, hydroxyalkylmonoethanolamine salts, and aliphatic quaternary ammonium salts; anionic surfactants such as aliphatic ethanolamines, aliphatic ethanolamine fatty acid esters, alkyl sulfonates, alkyl benzene sulfonates, alkyl naphthalene sulfonates, sulfosuccinates, α-olefin sulfonates, N-acylsulfonates, alkyl sulfates, alkyl ether sulfates, alkyl allyl ether sulfates, alkylamide sulfates, alkyl phosphates, alkyl ether phosphates, alkyl allyl ether phosphates, alkyl ether carboxy later, and N-acylamino acid salts; nonionic surfactants such as alkyl and alkyl allyl polyoxyethylene ethers, alkylallylformaldehyde condensed polyoxyethylene ethers, polyoxyethylene polyoxypropyl alkyl ethers, polyoxyethylene ethers of glycerol esters, polyoxyethylene ethers of sorbitan esters, polyoxyethylene ethers of sorbitol esters, polyethylene glycol fatty acid esters, glycerol esters, higher fatty acid glycerol esters, polyglycerol esters, sorbitan esters, propylene glycol esters, sucrose esters, aliphatic alkanolamides, polyoxyethylene fatty acid amides, polyoxyethylene alkylamines, and amine oxides; and ampholytic surfactants such as carboxybetaine, imidazolinium betaine, and aminocarboxylates.

These water-soluble organic substances may be used alone or in combination of two or more.

Among these water-soluble organic substances, polyethylene glycol, melamine, or stearyl diethanolamine may be used in view of ease of formation of cells with a uniform diameter, ease of formation of beads with good moldability, safety in production, and cost effectiveness.

The content of the water-soluble organic substance in the polypropylene-based resin composition used in one or more embodiments of the present invention may be 0.1 parts by weight to 3.0 parts by weight, such as 0.2 parts by weight to 1.0 part by weight, based on 100 parts by weight of the polypropylene-based resin.

If the content of the water-soluble organic substance is less than 0.1 parts by weight, there will be a tendency to fail to obtain the effect of preventing the carbon black from dropping off of the molded article of the conductive polypropylene-based foamed resin particles. If the content of the water-soluble organic substance is more than 3.0 parts by weight, the foamed particles will tend to have a high water content so that a long time will be required to dry them, or the foamed particles will tend to shrink immediately after the foaming due to the condensation of the contained water.

In general, polypropylene-based foamed resin particles containing conductive carbon black at a high concentration have relatively low fluidity, so that the cell film can be easily distorted due to stretching during the foaming and the pressure in the foamed particles (hereinafter referred to as the "internal pressure"), which is applied by the pressurization treatment described below, can easily decrease at a higher rate. If the internal pressure rapidly decreases as mentioned above, the resulting polypropylene-based foamed resin particles will have lower moldability, which will make it difficult to stably obtain an excellent molded article with a high expansion ratio, and the resulting molded article will tend to have a lower level of dimensional stability, surface smoothness, or other properties, or a lower level of physical properties such as residual compressive strain.

In contrast, the conductive polypropylene-based foamed resin particles of one or more embodiments of the present invention are used to provide foamed particles that have high foaming power and resist the release of the applied internal pressure because the polypropylene-based resin composition used as a raw material to form the conductive polypropylene-based resin particles has a melting point Tm of 145° C. or more and 155° C. or less as measured by the DSC method and also has a difference ΔT of 50° C. or more between the melting point Tm and the crystal melting start temperature Tl. The conductive polypropylene-based foamed resin particles are used to also provide secondary expanded particles that have a low internal-pressure decrease rate, high expansion power, and good moldability and can significantly suppress the dropping off of the carbon black, even though the distortion of the cell film can be significant in the secondary expanded particles described below due to cell film stretching performed at low temperature.

In this regard, the melting point Tm and the crystal melting start temperature Tl can be measured by the method described below in the Examples section using a differential scanning calorimeter.

A method for controlling the difference ΔT between the melting point Tm and the crystal melting start temperature Tl of the polypropylene-based resin composition to 50° C. or more may include using a base resin with a broad composition distribution. In the case of ethylene-propylene random copolymers, for example, a blend of ethylene-propylene random copolymers in which difference in ethylene content of these copolymers is 5% or more can easily form a polypropylene-based resin composition having a ΔT of 50° C. or more.

Moreover, foamed particles with higher foaming power can be obtained when, in the DSC curve, the rate of occupancy of the endothermic area Ql in the range of not higher than 115° C. (=Ql/Q×100) (hereinafter also referred to as the rate of occupancy by the endothermic area in the range of not higher than 115° C. in DSC measurement) is in the range of 5% or more and less than 10% of the total endothermic peak calorific area Q.

The rate of occupancy by the endothermic area in the range of not higher than 115° C. in DSC measurement may be from 6% to 9%. If the occupancy rate is less than 5%, the in-mold foamed molding will tend to produce foamed particles with lower foaming power. If the occupancy rate is more than 10%, the in-mold foamed product will tend to have a lower level of physical properties such as compressive strength.

In this regard, the DSC curve of the polypropylene-based resin composition refers to the curve obtained by a differential scanning calorimetry method (hereinafter referred to as "DSC method"), specifically, refers to the endothermic curve obtained when 4 mg to 6 mg of the resin is melted by heating at a temperature increase rate of 10° C./minute from 40° C. to 220° C., then crystallized by cooling at a temperature decrease rate of 10° C./minute from 220° C. to 40° C., and then heated at a temperature increase rate of 10° C./minute from 40° C. to 220° C. In this process, the melting point Tm is defined as the peak temperature of the endothermic curve.

For example, as shown in FIG. 1, a straight line is obtained as a base line by extending the line BC, in which B and C are the 190° C. point and the 170° C. point, respectively, on the DSC curve having the peak temperature A (Tm). In the graph, D and E are the low temperature-side intersection point (called "the crystal melting start temperature Tl") and the high temperature-side intersection point, respectively, between the base line and the DSC curve. On the other hand, a straight line at a temperature of 115° C. is drawn parallel to the vertical axis of the graph, which has an intersection point F with the DSC curve and an intersection point C with the base line. The endothermic area Ql in the range of not higher than 115° C. is defined as the area of the region surrounded by the DSC curve, the line segment D-G, and the line segment F-G. The total endothermic peak calorific area Q is defined as the area of the region surrounded by the DSC curve and the line segment D-E.

A resin with a broad molecular-weight distribution or a broad composition distribution may be used as the base resin in order to obtain a resin composition whose rate of occupancy by the endothermic area in the range of not higher than 115° C. in DSC measurement is in the range of 5% or more and less than 10%. A polypropylene-based resin may be used in which the content of components eluted at 40° C. or lower in cross fractionation chromatography analysis (CFC analysis) is high.

Polypropylene-based resins with a broad molecular-weight distribution or a broad composition distribution can be easily found out from polypropylene-based resins produced by polymerization using Ziegler-Natta catalysts, which tend to produce non-stereoregular polymers, rather than from polypropylene-based resins produced by polymerization using metallocene catalysts, which tend to produce highly stereoregular polymers. A resin composition having a rate of occupancy of 5% or more and less than 10% by the endothermic area in the range of not higher than 115° C. in DSC measurement can also be obtained by blending several high-melting-point polypropylene-based resins with melting points of 145° C. or more and several low-melting-point polypropylene-based resins with melting points of less than 145° C.

The polypropylene-based resin composition used in one or more embodiments of the present invention may contain various additives such as an antioxidant, a light resistance improver, and a flame retardant.

Examples of the antioxidant include, but are not limited to, phenolic antioxidants and phosphorus antioxidants.

Examples of the light resistance improver include, but are not limited to, hindered amine light resistance improvers.

Examples of the flame retardant include, but are not limited to, halogen flame retardants, phosphorus flame retardants, and hindered amine flame retardants.

Generally, to increase kneadability, a raw material mixture may be formed in advance by subjecting the polypropylene-based resin and the conductive carbon black to melt kneading using an extruder, a kneader, a Banbury mixer, a roll, or other means.

Subsequently, a polypropylene-based resin composition may be formed by subjecting the raw material mixture, the water-soluble organic substance, and optionally other additives to melt kneading using an extruder, a kneader, a Banbury mixer, a roll, or other means, in which the above components may be subjected to melt kneading in any order.

The polypropylene-based resin composition is formed into particles with a desired shape such as a cylindrical shape, an oval shape, a spherical shape, a cubic shape, a cuboid shape, or a tube shape (straw shape), so that conductive polypropylene-based resin particles are obtained. In view of productivity for ease of use in foaming, the forming method typically includes subjecting the raw material mixture and other additives to melt kneading with an extruder, extruding the mixture in the form of a strand from the front end of the extruder, and then cutting the strand to form the polypropylene-based resin particles.

In one or more embodiments of the present invention, the conductive polypropylene-based resin particles may have an average particle size of 0.1 mm to 10 mm, such as 0.5 mm to 5 mm, and may have an average weight of 0.1 mg to 100 mg, such as 0.3 mg to 10 mg.

The average particle size can be determined by measuring, with a vernier caliper, the dimensions of ten of the resin particles in the major and minor axis directions and then calculating the arithmetic mean of the measurements.

In one or more embodiments of the present invention, the conductive polypropylene-based foamed resin particles are produced by foaming the conductive polypropylene-based resin particles.

The conductive polypropylene-based foamed resin particles may be produced, for example, as follows.

The conductive polypropylene-based resin particles, an aqueous medium, an inorganic dispersant, a foaming agent, and other optional materials are placed in a pressure-resistant container, and then dispersed under stirring conditions and heated to a temperature equal to or higher than the softening point of the conductive polypropylene-based resin particles. Subsequently, the dispersion is optionally held at the temperature reached after the heating for a time period of more than 0 minutes to 120 minutes, and then the dispersion is discharged from the pressure-resistant container to a region at a pressure lower than the internal pressure in the pressure-resistant container, so that conductive polypropylene-based foamed resin particles are obtained. The region at a pressure lower than the internal pressure in the pressure-resistant container may be at atmospheric pressure.

This foaming process is called the "first-step foaming process", and the resulting conductive polypropylene-based foamed resin particles are called the "first-step foamed particles".

The dispersion refers to the liquid mixture obtained by placing the conductive polypropylene-based resin particles, the aqueous medium, the inorganic dispersant, the foaming agent, and other optional materials in the pressure-resistant container and dispersing them under stirring conditions.

In this process, when the temperature in the pressure-resistant container is raised to a temperature equal to or higher than the softening point, the temperature may be raised to a temperature in the range of the melting point of the conductive polypropylene-based resin particles, i.e. −20° C., to the melting point of the conductive polypropylene-based resin particles, i.e. +10° C., so that the foamability can be ensured. In this regard, the temperature to be reached should be appropriately determined depending on the type of the polypropylene-based resin used as a raw material, the expansion ratio, or other factors, and should also be appropriately changed depending on the type of the foaming agent used.

The melting point of the conductive polypropylene-based resin particles may be measured by the DSC method. Specifically, the melting point of the conductive polypropylene-based resin particles may be determined from a DSC curve obtained by a process that includes melting 4 mg to 6 mg of the conductive polypropylene-based resin particles by heating at a temperature increase rate of 10° C./minute from 40° C. to 220° C., then cooling the resin particles at a temperature decrease rate of 10° C./minute from 220° C. to 40° C. to crystallize the resin particles, and then heating the resin particles at a temperature increase rate of 10° C./minute from 40° C. to 220° C. In the DSC curve, the melting point may be determined as the melting peak temperature during the second heating.

Examples of the aqueous medium used in one or more embodiments of the present invention include water, an alcohol, ethylene glycol, and glycerol, which may be used alone or in any combination, for example. In view of foamability, workability, or safety, water may be used.

The aqueous medium may be used in an amount of 50 parts by weight to 500 parts by weight, such as in an amount of 100 parts by weight to 350 parts by weight, based on 100 parts by weight of the conductive polypropylene-based resin particles. If the amount of the aqueous medium is less than 50 parts by weight, some of the conductive polypropylene-based resin particles in the pressure-resistant container may easily stick together. If the amount of the aqueous medium is more than 350 parts by weight, the productivity of the conductive polypropylene-based foamed resin particles may decrease. As used herein, the term "stick together" means the phenomenon that resin particles or foamed particles undergo unintentional blocking so that they stick together in the form of a grape-like cluster.

Examples of the inorganic dispersant used in one or more embodiments of the present invention include tribasic calcium phosphate, tribasic magnesium phosphate, basic magnesium carbonate, calcium carbonate, basic zinc carbonate, aluminum oxide, iron oxide, titanium oxide, aluminosilicate, kaolin, and barium sulfate, which may be used alone or in any combination. In view of the stability of the dispersion, tribasic calcium phosphate, kaolin, or barium sulfate may be used.

If the stability of the dispersion decreases, some of the conductive polypropylene-based resin particles may stick together or form a cluster in the pressure-resistant container, which may produce conductive polypropylene-based foamed resin particles sticking together, may make it impossible to produce conductive polypropylene-based foamed resin particles due to the cluster of conductive polypropylene-based resin particles remaining in the pressure-resistant container, or may reduce the productivity of conductive polypropylene-based foamed resin particles.

A dispersion auxiliary agent may be further used to increase the stability of the dispersion in the pressure-resistant container. The dispersion auxiliary agent may be, for example, an anionic surfactant, examples of which include sodium dodecylbenzenesulfonate, sodium alkanesulfonate, sodium alkylsulfonate, sodium alkyl diphenyl ether disulfonate, and sodium α-olefinsulfonate.

The amount of the inorganic dispersant or the dispersion auxiliary agent used depends on the type of the dispersant or the auxiliary agent and the type and amount of the conductive polypropylene-based resin particles used. In general, the inorganic dispersant may be used in an amount 0.1 parts by weight to 5 parts by weight based on 100 parts by weight of the aqueous medium, and the dispersion auxiliary agent may be used in an amount of 0.001 parts by weight to 0.3 parts by weight based on 100 parts by weight of the aqueous medium. If used in too small an amount, the inorganic dispersant or the dispersion auxiliary agent will fail to inhibit the sticking of some of the conductive polypropylene-based resin particles in the pressure-resistant container. If the inorganic dispersant or the dispersion auxiliary agent is used in too large an amount, a large amount of the dispersant may remain on the surface of the conductive polypropylene-based foamed resin particles, which will be a cause of the inhibition of fusion between the conductive polypropylene-based foamed resin particles during the molding described below.

As used herein, the term "fusion" means a process of melting the surface layer resin of foamed particles by heating during in-mold molding so that the foamed particles are intentionally bonded together to form an integrated molded article.

Examples of the foaming agent used in one or more embodiments of the present invention include organic foaming agents such as propane, n-butane, isobutane, n-pentane, isopentane, hexane, cyclopentane, and cyclobutane, and inorganic foaming agents such as carbon dioxide, water, air, and nitrogen. These foaming agents may be used alone or in combination of two or more.

Among these foaming agents, isobutane and n-butane may be used because they can easily improve the expansion ratio. On the other hand, in view of safety, inorganic foaming agents such as carbon dioxide, water, air, and nitrogen may be used.

The foaming agent may be used in any appropriate amount depending on the desired expansion ratio of conductive polypropylene-based foamed resin particles. In general, the foaming agent may be used in an amount of 2 parts by weight to 60 parts by weight based on 100 parts by weight of the conductive polypropylene-based resin particles.

Any pressure-resistant container capable of withstanding the pressure and temperature inside a container may be used in the production of the conductive polypropylene-based foamed resin particles. For example, an autoclave-type pressure-resistant container may be used.

Methods for obtaining conductive polypropylene-based foamed resin particles with a high expansion ratio include a method of selecting an organic foaming agent such as isobutane or n-butane in a first-step foaming process and a method of using a large amount of a foaming agent in a first-step foaming process. Besides these methods, a high expansion ratio can also be achieved by a process that includes obtaining conductive polypropylene-based foamed resin particles (first-step foamed particles) with a relatively low expansion ratio (an expansion ratio of about 2 to about 35) by a first-step foaming process, then pressurizing the particles with an inorganic gas to apply an internal pressure to them, and then heating the particles with steam to expand the particles again.

For example, a high expansion ratio can be achieved by a process that includes producing first-step foamed particles with an expansion ratio of 2 to 35 by a first-step foaming process, placing the first-step foamed particles in a pressure-resistant container, making the pressure in the first-step foamed particles higher than the normal pressure by pressurization with nitrogen, air, carbon dioxide, or other gases at a pressure of 0.1 MPa (gauge pressure) to 0.6 MPa (gauge pressure), and then heating the first-step foamed particles with steam or other means to further expand them. This expansion process is called a "secondary expansion process", and the resulting conductive polypropylene-based foamed resin particles are called "secondary expanded particles". During the secondary expansion, the steam pressure may be from 0.05 MPa to 0.15 MPa and the steam temperature may be from 80° C. to 115° C.

In general, the resin fluidity is lower and the resin film is more likely to be distorted in the secondary expansion process than in the first-step foaming process, because the temperature at which the foamed particles are stretched is lower in the secondary expansion process than in the first-step foaming process. Particularly when conductive polypropylene-based foamed resin particles containing a high concentration of conductive carbon black are produced, the resin fluidity can significantly decrease and the cell film can be easily distorted, so that the internal pressure in the expanded particles, which is applied by pressurization, can easily decrease at a high rate. If the internal pressure in conventional foamed particles rapidly decreases, the resulting particles will have low moldability, which will make it difficult to stably obtain an excellent molded article with a high expansion ratio, and the resulting molded article will tend to have a low level of dimensional stability, surface smoothness, or other properties or a low level of physical properties such as residual compressive strain.

In contrast, the conductive polypropylene-based foamed resin particles, even when they are secondary expanded particles, resist the leakage of the applied internal pressure, so that they have high foaming power and thus good moldability.

The shape of the conductive polypropylene-based foamed resin particles, which can be obtained as described above, may be, but is not limited to, a spherical or substantially spherical shape in view of filling properties into a mold for in-mold foamed molding. In some cases, for example, an in-mold foamed molding article having voids is intentionally produced so that the in-mold foamed molding article can have the ability to absorb sound or to permeate water. In such cases, cylindrical, oval, cuboid, or tubular (straw-shaped) conductive polypropylene-based foamed resin particles may be used.

When the conductive polypropylene-based foamed resin particles are spherical or substantially spherical, they may have any average diameter, which may vary with the size of the conductive polypropylene-based resin particles before the foaming, the expansion ratio, or other factors. They may have an average diameter of 0.5 mm to 10 mm, such as 1 mm to 7 mm, or such as 2 mm to 5 mm.

The conductive polypropylene-based foamed resin particles with an average diameter of less than 0.5 mm will tend to have poor workability for in-mold foamed molding. The conductive polypropylene-based foamed resin particles with an average diameter of more than 10 mm will tend to have limitations on molded article shape, such as the impossibility to produce molded articles having a thinner portion.

The average diameter can be determined by measuring, with a vernier caliper, the dimensions of ten of the resin foamed particles in the major and minor axis directions and then calculating the arithmetic mean of the measurements.

The average weight of the conductive polypropylene-based foamed resin particles of one or more embodiments of the present invention is substantially the same as that of the conductive polypropylene-based resin particles, and may be from 0.1 mg per particle to 100 mg per particle, such as from 0.3 mg per particle to 10 mg per particle.

The conductive polypropylene-based foamed resin particles with an average weight of less than 0.1 mg will tend to vary in weight during production. The conductive polypropylene-based foamed resin particles with an average weight of more than 100 mg will have a large diameter and thus have inferior mold-filling properties.

The average weight can be determined by measuring the weight of ten of the resin foamed particles with an electronic balance and averaging the measurements.

The conductive polypropylene-based foamed resin particles of one or more embodiments of the present invention may have an expansion ratio of 2 to 60, such as 3 to 40.

As used herein, the term "expansion ratio" refers to the true ratio that can be calculated from the density of the conductive polypropylene-based resin particles before the foaming and the weight and water-displacement volume of the conductive polypropylene-based foamed resin particles.

The conductive polypropylene-based foamed resin particles of one or more embodiments of the present invention obtained as described above may be subjected to common in-mold foam molding to form a conductive polypropylene-based resin in-mold foamed molding article.

The process of subjecting the conductive polypropylene-based foamed resin particles to in-mold foamed molding may be performed using a conventionally known method, such as (A) a method in which the particles are used as they are, (B) a method in which an inorganic gas such as air is injected under pressure into the foamed particles in advance to allow the foamed particles to have the ability to foam (internal pressure), or (C) a method in which the foamed particles compressed and loaded in a mold are subjected to molding.

The conductive polypropylene-based foamed resin particles of one or more embodiments of the present invention may be significantly effective in the method (B) in which an inorganic gas such as air is injected under pressure into the foamed particles in advance to allow the foamed particles to have the ability to foam (internal pressure). In the method (B), the foamed particles resist the decrease in the applied internal pressure and thus have high foaming power when loaded and molded in a mold.

In one or more embodiments of the present invention, a method for producing a conductive polypropylene-based resin in-mold foamed molding article from the conductive polypropylene-based foamed resin particles may include, for example, loading the conductive polypropylene-based foamed resin particles in a mold that can be closed but cannot be hermetically sealed, fusing the conductive polypropylene-based foamed resin particles together by heating with a heating medium such as steam at a pressure of about 0.05 MPa (gauge pressure) to about 0.5 MPa (gauge pressure) for about 3 seconds to about 30 seconds, then cooling the mold with water to such an extent that the in-mold foamed molding article can be kept from being deformed after the in-mold foamed molding article is taken out, and then opening the mold to obtain the in-mold foamed molding article.

The conductive polypropylene-based resin in-mold foamed molding article obtained by the above method is less likely to cause the conductive carbon black to drop off, has good appearance properties such as good surface appearance and flat and smooth surface, and has a high level of physical properties such as compressive strength and dimensional stability.

EXAMPLES

Next, the one or more embodiments of present invention will be described with reference to examples and comparative examples, which, however, are not intended to limit the present invention.

The raw materials used in examples and comparative examples are as follows.
(1) Polypropylene-Based Resin
Polypropylene-based resin A: F227A (ethylene random copolymer, manufactured by Prime Polymer Co., Ltd., melting point: 141.7° C., weight average molecular weight (Mw)/number average molecular weight (Mn)=7.7)
Polypropylene-based resin B: trial product (1) (ethylene random copolymer, manufactured by Prime Polymer Co., Ltd., melting point: 147.2° C., Mw/Mn=8.9)
Polypropylene-based resin C: trial product (1) 50%+F227A 50% (ethylene random copolymer, manufactured by Prime Polymer Co., Ltd., melting point: 146.5° C., Mw/Mn=8.3)
Polypropylene-based resin D: trial product (2) (ethylene random copolymer, manufactured by Prime Polymer Co., Ltd., melting point: 151.1° C., Mw/Mn=6.8)
Polypropylene-based resin E: trial product (3) (ethylene random copolymer, manufactured by Prime Polymer Co., Ltd., melting point: 160° C., Mw/Mn=2.8)
(2) Conductive Carbon Black
Carbon black A (DENKA BLACK Powder Product, manufactured by Denka Company Limited)
Carbon black B (Ketjen Black EC600D, manufactured by Lion Corporation)
(3) Water-Soluble Organic Substance
Polyethylene glycol (PEG #300, manufactured by Lion Corporation)
Melamine (manufactured by Nissan Chemical Industries, Ltd.)
Stearyl diethanolamine (SDEA) (TS-6B, manufactured by Kao Corporation)
(4) Foaming Agent
Carbon dioxide (manufactured by AIR WATER INC.)
Isobutane (manufactured by Mitsui Chemicals, Inc.)
In examples and comparative examples, evaluations were performed by the methods described below.

(Melting Point of Polypropylene-Based Resin Composition)

Using a differential scanning calorimeter (DSC) (Model DSC6200, manufactured by Seiko Instruments Inc.), 4 mg to 6 mg of a polypropylene-based resin composition was melted by heating at a temperature increase rate of 10° C./minute from 40° C. to 220° C., then crystallized by cooling at a temperature decrease rate of 10° C./minute from 220° C. to 40° C., and then heated again at a temperature increase rate of 10° C./minute from 40° C. to 220° C. to obtain a second DSC curve.

In this process, the melting point Tm was defined as the peak temperature of the second DSC curve.

(Temperature Difference ΔT Between Melting Point and Crystal Melting Start Temperature of Polypropylene-Based Resin Composition)

Using a differential scanning calorimeter (DSC) (Model DSC6200, manufactured by Seiko Instruments Inc.), 4 mg to 6 mg of a polypropylene-based resin composition was melted by heating at a temperature increase rate of 10°

C./minute from 40° C. to 220° C., then crystallized by cooling at a temperature decrease rate of 10° C./minute from 220° C. to 40° C., and then heated again at a temperature increase rate of 10° C./minute from 40° C. to 220° C. to obtain a second DSC curve.

Among the points on the second DSC curve, the points at temperatures of 190° C. and 170° C. were designated as B and C, respectively, and a straight line was obtained as a base line by extending the line B-C. Of the intersection points between the base line and the DSC curve, the low temperature-side point was designated as D, and the high temperature-side point was designated as E. The crystal melting start temperature Tl was defined as the temperature at the intersection point D. The temperature difference ΔT between the melting point Tm and the crystal melting start temperature Tl was calculated from the following formula ΔT (° C.)=Tm (° C.)−Tl (° C.).

(Rate of Occupancy by Endothermic Area in the Range of not Higher than 115° C. for Polypropylene-Based Resin Composition)

Using a differential scanning calorimeter (DSC) (Model DSC6200, manufactured by Seiko Instruments Inc.), 4 mg to 6 mg of a polypropylene-based resin composition was melted by heating at a temperature increase rate of 10° C./minute from 40° C. to 220° C., then crystallized by cooling at a temperature decrease rate of 10° C./minute from 220° C. to 40° C., and then heated again at a temperature increase rate of 10° C./minute from 40° C. to 220° C. to obtain a second DSC curve.

Among the points on the second DSC curve, the points at temperatures of 190° C. and 170° C. were designated as B and C, respectively, and a straight line was obtained as a base line by extending the line B-C. Of the intersection points between the base line and the DSC curve, the low temperature-side point was designated as D, and the high temperature-side point was designated as E. On the other hand, a line at a temperature of 115° C. was drawn parallel to the vertical axis of the graph, which had an intersection point F with the DSC curve and an intersection point G with the base line. The endothermic area Ql in the range of not higher than 115° C. was defined as the area of the region surrounded by the DSC curve, the line segment D-G, and the line segment F-G. The total endothermic peak calorific area Q was defined as the area of the region surrounded by the DSC curve and the line segment D-E.

The rate of occupancy by the endothermic area in the range of not higher than 115° C. was calculated from the following formula: rate (%) of occupancy by endothermic area in the range of not higher than 115° C.=Ql/Q×100.

(Expansion Ratio of Conductive Polypropylene-Based Foamed Resin Particles)

The weight w (g) of conductive polypropylene-based foamed resin particles with a bulk volume of about 50 cm³ was determined. The conductive polypropylene-based foamed resin particles were then immersed in ethanol, and the resulting increase in volume (ethanol-displacement volume) v (cm³) was determined. The expansion ratio of the conductive polypropylene-based foamed resin particles was determined from the weight w, the volume v, and the density d (g/cm³) of the conductive polypropylene-based resin particles before the foaming using the following formula: expansion ratio of conductive polypropylene-based foamed resin particles d×v/w. In the calculation, 0.9 g/cm³ was used as the density d of the conductive polypropylene-based resin particles.

(Cell Diameter in Conductive Polypropylene-Based Foamed Resin Particles)

Ten foamed particles were randomly sampled. Each sample was cut with sufficient care not to break cell films. The cut section of each sample was observed with a microscope (VHX Digital Microscope, manufactured by Keyence Corporation). A line with a length corresponding to 1 mm was drawn on the observed image region, except the surface layer region. The number of cells through which the line passed was measured and then used to determine the average cell diameter according to ASTM D 3576. The cell diameter determined in this way was evaluated on the basis of the following criteria.

◯: The average cell diameter is 150 μm or more.
Δ: The average cell diameter is from 100 μm to less than 150 μm.
x: The average cell diameter is less than 100 μm.

(Cell Uniformity of Conductive Polypropylene-Based Foamed Resin Particles)

Ten foamed particles were randomly sampled. Each sample was cut with sufficient care not to break cell films. The cut section of each sample was observed with a microscope at a magnification of 50 times and evaluated on the basis of the following criteria.

◯: There are observed almost no variations in cell size within particles or between particles.
Δ: There are observed some variations in cell size within particles and between particles.
x: There are observed significantly large and small cells within particles and between particles.

(Rate of Decrease of Internal Pressure in Conductive Polypropylene-Based Foamed Resin Particles)

The rate of decrease of the internal pressure in conductive polypropylene-based foamed resin particles was evaluated on the basis of the following criteria.

An internal pressure of 0.24 MPa was applied to the resulting foamed particles by pressurization. Subsequently, the particles were allowed to stand under the normal pressure at 23° C., and the time taken until the pressure reached 0.16 MPa was measured.

As the decrease of the internal pressure becomes slower, the internal pressure is kept longer during the heating in the mold for molding or in the pre-foaming machine for secondary expansion, and thus the foaming power becomes higher.

⊚: The time taken until the pressure reaches 0.16 MPa is 1 hour and 30 minutes or more.
◯: The time taken until the pressure reaches 0.16 MPa is from 1 hour to less than 1 hour and 30 minutes.
Δ: The time taken until the pressure reaches 0.16 MPa is from 30 minutes to less than 1 hour.
x: The time taken until the pressure reaches 0.16 MPa is less than 30 minutes.

(Carbon Black Dropping Off of Foamed Molding Article)

A test piece of 50 mm long×50 mm wide×25 mm thick was cut from the resulting conductive polypropylene-based resin in-mold foamed molding article. A plate was placed on the test piece and allowed to stand for 240 hours under the conditions of a temperature of 60° C. and a humidity of 90%. Subsequently, the surface state of the plate was observed using a scanning electron microscope (MARLIN manufactured by ZEISS). Three samples under each condition were observed, and the observed plate surface state was evaluated on the basis of the following criteria.

◯: No carbon black drops off of any samples.
Δ: Carbon black is observed to drop off in one or more of the samples.
x: Carbon black is observed to drop off in all samples.

(Compressive Strength of Foamed Molding Article)

A test piece of 50 mm long×50 mm wide×25 mm thick was cut from the resulting conductive polypropylene-based resin in-mold foamed molding article. According to NDZ Z 0504, the compressive stress (MPa) of the test piece was measured when the test piece was compressed by 25% at a rate of 10 mm/minute.

In this test, the test piece was cut from the foamed molding article with a thickness of at least 50 mm in such a manner that the surface layers at both ends were removed by at least 20% of the thickness of the original foamed molding article.

The 25% compressive strength of the foamed molding article obtained from conductive polypropylene-based foamed resin particles with an expansion ratio of about 13 was evaluated on the basis of the following criteria.

◯: The 25% compressive strength is 0.20 MPa or more.

×: The 25% compressive strength is less than 0.20 MPa.

The 25% compressive strength of the foamed molding article obtained from conductive polypropylene-based foamed resin particles with an expansion ratio of about 18 was evaluated on the basis of the following criteria.

◯: The 25% compressive strength is 0.10 MPa or more.

×: The 25% compressive strength is less than 0.10 MPa.

(Dimensional Stability of Foamed Molding Article)

The long axis dimension L (mm) of the resulting cuboid in-mold foamed molding article was measured with a vernier caliper. The shrinkage percentage of the product was calculated from the long axis dimension L (mm) and the long axis dimension L0 of the mold (L0=300 (mm)) using the formula below and then evaluated on the basis of the following criteria.

Long axis dimension shrinkage percentage of molded article=$(1-L/L0)\times 100(\%)$ ◯: The long axis dimension shrinkage percentage is less than 2.5%.

Δ: The long axis dimension shrinkage percentage is from 2.5% to less than 4.0%.

×: The shrinkage percentage is 4.0% or more.

(Surface Appearance)

Voids present in the same face and the same portion on a surface of the resulting cuboid in-mold foamed molding article were observed and counted in an image obtained by scanning with a combined printer (iR-ADV C5035, manufactured by Canon Inc.). In this case, the void was defined as a void of 0.5 mm$^2$ or more in the scanned image of the molded article surface without magnification. In this test, the surface appearance was evaluated on the basis of the following criteria.

◯: The number of voids in a surface area of 50 mm×50 mm is less than 5.

Δ: The number of voids in a surface area of 50 mm×50 mm is from 5 to less than 10.

×: The number of voids in a surface area of 50 mm×50 mm is 10 or more.

(Color Uniformity of Molded Article)

The resulting cuboid in-mold foamed molding articles were observed and subjected to comparative evaluation on the basis of the following criteria.

◯: There is little unevenness in color.

Δ: Unevenness in color is observed.

×: There is significant unevenness in color.

Examples 1 to 9

[Production of Conductive Polypropylene-Based Resin Particles]

A polypropylene-based resin, conductive carbon black, and a water-soluble organic substance were mixed according to Table 1, which shows the type and amount of the materials. The mixture was kneaded in a 50 mmφ extruder (resin temperature: 210° C.) and then extruded in the form of a strand from the front end of the extruder. Subsequently, conductive polypropylene-based resin particles (1.2 mg per particle) were produced by cutting the strand into particles. The resulting conductive polypropylene-based resin particles were measured for melting point, ΔT, and the rate of occupancy by the endothermic area in the range of not higher than 115° C. in DSC measurement. The results are shown in Table 1.

[Production of Conductive Polypropylene-Based First-Step Foamed Resin Particles]

To a 10 L pressure-resistant container were added 300 parts by weight of water, 100 parts by weight of the resulting conductive polypropylene-based resin particles, 1.0 part by weight of tribasic calcium phosphate as a dispersant, and 0.5 parts by weight of sodium n-paraffinsulfonate as a dispersion auxiliary agent. Further, 6.0 parts by weight of carbon dioxide as a foaming agent was added to the mixture. The resulting mixture was heated under stirring and held for 30 minutes at the foaming temperature (container temperature) and foaming pressure (container pressure) shown in Table 1. Subsequently, while the foaming pressure was maintained using carbon dioxide, the dispersion was discharged to the atmospheric pressure outside through a 3 mmφ orifice provided at the bottom of the pressure-resistant container, so that first-step foamed particles were obtained. The resulting conductive polypropylene-based foamed resin particles were measured for expansion ratio, cell diameter, cell uniformity, and the rate of decrease of internal pressure. The results are shown in Table 1.

[Production of In-Mold Foamed Molding Article from Conductive Polypropylene-Based First-Step Foamed Resin Particles]

Subsequently, the resulting first-step foamed particles, to which an internal pressure of 0.2 MPa was applied, were loaded into a cuboid mold with a long axis of 400 mm, a short axis of 300 mm, and a thickness of 60 mm, and then fused by heating with steam (0.3 MPa), so that an in-mold foamed molding article was obtained, which was taken out of the mold.

After taken out of the mold, the in-mold foamed molding article was dried and cured in a drier at 70° C. for 24 hours. The resulting in-mold foamed molding article was evaluated or measured for the dropping off of the carbon black, compressive strength, dimensional stability, surface appearance, and color uniformity. The results are shown in Table 1.

[Production of Conductive Polypropylene-Based Secondary Expanded Resin Particles]

The resulting first-step foamed particles were added to a pressure-resistant container with a volume of 1 m$^3$ and pressurized with air so that an internal pressure higher than the normal pressure was applied to the first-step foamed particles as shown in Table 1. Subsequently, the particles were transferred to a secondary expansion machine and then further expanded by heating under the steam pressure shown in Table 1, so that secondary expanded particles were obtained. The resulting conductive polypropylene-based foamed resin particles were measured for expansion ratio, cell diameter, cell uniformity, and the rate of decrease of internal pressure. The results are shown in Table 1.

[Production of In-Mold Foamed Molding Article from Conductive Polypropylene-Based Secondary Expanded Resin Particles]

Subsequently, the resulting secondary expanded particles, to which an internal pressure of 0.2 MPa was applied, were loaded into a cuboid mold with a long axis of 400 mm, a short axis of 300 mm, and a thickness of 60 mm, and then fused by heating with steam, so that an in-mold foamed molding article was obtained, which was taken out of the mold. In this process, the steam pressure was 0.3 MPa (molding condition).

After taken out of the mold, the in-mold foamed molding article was dried and cured in a drier at 70° C. for 24 hours. The resulting in-mold foamed molding article was evaluated or measured for the dropping off of the carbon black, compressive strength, dimensional stability, surface appearance, and color uniformity. The results are shown in Table 1.

TABLE 1

| | | | | Example | | | | | | | | |
|---|---|---|---|---|---|---|---|---|---|---|---|---|
| | | | | 1 | 2 | 3 | 4 | 5 | 6 | 7 | 8 | 9 |
| Polypropylene-based resin composition | Polypropylene-based resin | Polypropylene-based resin A | Parts by weight | | | | | | | | | |
| | | Polypropylene-based resin B | Parts by weight | 100 | 100 | 100 | 100 | 100 | 100 | 100 | 100 | |
| | | Polypropylene-based resin C | Parts by weight | | | | | | | | | 100 |
| | | Polypropylene-based resin D | Parts by weight | | | | | | | | | |
| | | Polypropylene-based resin E | Parts by weight | | | | | | | | | |
| | Conductive carbon black | Carbon black A | Parts by weight | 25 | 17.6 | 33.3 | 25 | 25 | | 25 | 25 | 25 |
| | | Carbon black B | Parts by weight | | | | | | 25 | | | |
| | Water-soluble organic substance | Polyethylene glycol | Parts by weight | 0.63 | 0.59 | 0.67 | 0.94 | 0.24 | 0.63 | | | 0.63 |
| | | Melamine | Parts by weight | | | | | | | 0.63 | | |
| | | Stearyl diethanolamine | Parts by weight | | | | | | | | 0.63 | |
| | Water-soluble inorganic substance | Zinc borate | Parts by weight | | | | | | | | | |
| | Melting point | | ° C. | 149 | 148 | 149 | 149 | 149 | 148 | 149 | 149 | 147 |
| | Difference ΔT between melting point and crystal melting start temperature | | ° C. | 57 | 55 | 60 | 56 | 57 | 56 | 54 | 56 | 56 |
| | Rate of occupancy by endothermic area in the range of not higher than 115° C. in DSC measurement | | % | 6.3 | 6.0 | 6.4 | 6.3 | 6.3 | 6.0 | 6.1 | 6.8 | 7.9 |
| Conductive polypropylene-based first-step foamed resin particles | First-step foaming conditions | Initially added amount of carbon dioxide | Parts by weight | 6.0 | 6.0 | 6.0 | 6.0 | 6.0 | 6.0 | 6.0 | 6.0 | 6.0 |
| | | Foaming temperature | ° C. | 151 | 150 | 151 | 151 | 150 | 150 | 150 | 150 | 151.8 |
| | | Foaming pressure (gauge pressure) | MPa | 3.0 | 3.0 | 3.1 | 2.7 | 3.3 | 3.2 | 2.8 | 2.9 | 3.0 |
| | First-step foamed particles | Expansion ratio | Times | 13 | 13 | 13 | 13 | 13 | 13 | 13 | 13 | 13 |
| | | Cell diameter | — | ○ | ○ | ○ | ○ | ○ | ○ | ○ | ○ | ○ |
| | | Cell diameter uniformity | — | ○ | ○ | ○ | ○ | ○ | ○ | ○ | Δ | ○ |
| | | Rate of decrease of internal pressure | — | ⊙ | ⊙ | ○ | ○ | ○ | ○ | ○ | ⊙ | ⊙ |
| | | Foamed particle internal pressure (absolute pressure) | MPa | 0.2 | 0.2 | 0.2 | 0.2 | 0.2 | 0.2 | 0.2 | 0.2 | 0.2 |
| | In-mold foamed molding conditions | Steam pressure (gauge pressure) | MPa | 0.3 | 0.3 | 0.3 | 0.3 | 0.3 | 0.3 | 0.3 | 0.3 | 0.3 |
| | In-mold foamed molding article | Dropping off of carbon black | — | ○ | ○ | ○ | ○ | ○ | ○ | ○ | ○ | ○ |
| | | Compressive strength | — | ○ | ○ | ○ | ○ | ○ | ○ | ○ | ○ | ○ |
| | | Dimensional stability | — | ○ | ○ | ○ | ○ | ○ | ○ | ○ | ○ | ○ |
| | | Surface appearance | — | ○ | ○ | ○ | ○ | ○ | ○ | ○ | ○ | ○ |
| | | Color uniformity | — | ○ | ○ | ○ | ○ | ○ | ○ | ○ | ○ | ○ |
| Conductive polypropylene-based | Secondary expansion conditions | Expanded particle internal pressure (absolute pressure) | MPa | 0.35 | 0.36 | 0.32 | 0.32 | 0.32 | 0.38 | 0.32 | 0.33 | 0.3 |

TABLE 1-continued

| | | | | Example | | | | | | | | |
|---|---|---|---|---|---|---|---|---|---|---|---|---|
| | | | | 1 | 2 | 3 | 4 | 5 | 6 | 7 | 8 | 9 |
| secondary expanded resin particles | Secondary expanded particles | Steam pressure (gauge pressure) | MPa | 0.12 | 0.09 | 0.15 | 0.12 | 0.13 | 0.13 | 0.14 | 0.10 | 0.11 |
| | | Expansion ratio | Times | 18 | 18 | 18 | 18 | 18 | 17 | 18 | 18 | 18 |
| | | Cell diameter | — | ○ | ○ | ○ | ○ | ○ | ○ | ○ | ○ | ○ |
| | | Cell diameter uniformity | — | ○ | ○ | ○ | ○ | ○ | ○ | ○ | Δ | ○ |
| | | Rate of decrease of internal pressure | — | ○ | ○ | ○ | ○ | ○ | ○ | ○ | ○ | ○ |
| | In-mold foamed molding conditions | Foamed particle internal pressure (absolute pressure) | MPa | 0.2 | 0.2 | 0.2 | 0.2 | 0.2 | 0.2 | 0.2 | 0.2 | 0.2 |
| | | Steam pressure (gauge pressure) | MPa | 0.3 | 0.3 | 0.3 | 0.3 | 0.3 | 0.3 | 0.3 | 0.3 | 0.3 |
| In-mold foamed molding article | | Dropping off of carbon black | — | ○ | ○ | ○ | ○ | ○ | ○ | ○ | ○ | ○ |
| | | Compressive strength | — | ○ | ○ | ○ | ○ | ○ | ○ | ○ | ○ | ○ |
| | | Dimensional stability | — | ○ | ○ | ○ | ○ | ○ | ○ | ○ | ○ | ○ |
| | | Surface appearance | — | ○ | ○ | ○ | ○ | ○ | ○ | ○ | ○ | ○ |
| | | Color uniformity | — | ○ | ○ | ○ | ○ | ○ | ○ | ○ | ○ | ○ |

Comparative Examples 1 to 11

[Production of Conductive Polypropylene Based Resin Particles]

A polypropylene-based resin, conductive carbon black, a water-soluble organic substance, and a water-soluble inorganic substance were mixed according to Table 2, which shows the type and amount of the materials. The mixture was kneaded in a 50 mmϕ extruder (resin temperature 210° C.) and then extruded in the form of a strand from the front end of the extruder. Subsequently, conductive polypropylene-based resin particles (1.2 mg per particle) were produced by cutting the strand into particles. The resulting conductive polypropylene-based resin particles were measured for melting point, ΔT, and the rate of occupancy by the endothermic area in the range of not higher than 115° C. in DSC measurement. The results are shown in Table 2.

[Production of Conductive Polypropylene-Based First-Step Foamed Resin Particles]

To a 10 L pressure-resistant container were added 300 parts by weight of water, 100 parts by weight of the resulting conductive polypropylene-based resin particles, 1.0 part by weight of tribasic calcium phosphate as a dispersant, and 0.5 parts by weight of sodium n-paraffinsulfonate as a dispersion auxiliary agent. Further, 6.0 parts by weight of carbon dioxide as a foaming agent was added to the mixture. The resulting mixture was heated under stirring and held for 30 minutes at the foaming temperature (container temperature) and foaming pressure (container pressure) shown in Table 2. Subsequently, while the foaming pressure was maintained using carbon dioxide, the dispersion was discharged to the atmospheric pressure outside through a 3 mmϕ orifice provided at the bottom of the pressure-resistant container, so that first-step foamed particles were obtained. The resulting conductive polypropylene-based foamed resin particles were measured for expansion ratio, cell diameter, cell uniformity, and the rate of decrease of internal pressure. The results are shown in Table 2.

[Production of In-Mold Foamed Molding Article from Conductive Polypropylene-Based First-Step Foamed Resin Particles]

Subsequently, the resulting first-step foamed particles, to which an internal pressure of 0.2 MPa was applied, were loaded into a cuboid mold with a long axis of 400 mm, a short axis of 300 mm, and a thickness of 60 mm, and then fused by heating with steam (0.3 MPa), so that an in-mold foamed molding article was obtained, which was taken out of the mold.

After taken out of the mold, the in-mold foamed molding article was dried and cured in a drier at 70° C. for 24 hours. The resulting in-mold foamed molding article was evaluated or measured for the dropping off of the carbon black, compressive strength, dimensional stability, surface appearance, and color uniformity. The results are shown in Table 2.

[Production of Conductive Polypropylene-Based Secondary Expanded Resin Particles]

The resulting first-step foamed particles were added to a pressure-resistant container with a volume of 1 m³ and pressurized with air so that an internal pressure higher than the normal pressure was applied to the first-step foamed particles as shown in Table 2. Subsequently, the particles were transferred to a secondary expansion machine and then further expanded by heating with steam, so that secondary expanded particles were obtained. The resulting conductive polypropylene-based foamed resin particles were measured for expansion ratio, cell diameter, cell uniformity, and the rate of decrease of internal pressure. The results are shown in Table 2.

[Production of In-Mold Foamed Molding Article from Conductive Polypropylene-Based Secondary Expanded Resin Particles]

The resulting secondary expanded particles, to which an internal pressure of 0.2 MPa was applied, were loaded into a cuboid mold with a long axis of 400 mm, a short axis of 300 mm, and a thickness of 60 mm, and then fused by heating with steam, so that an in-mold foamed molding article was obtained, which was taken out of the mold. In this process, the steam pressure was 0.3 MPa (molding condition).

After taken out of the mold, the in-mold foamed molding article was dried and cured in a drier at 70° C. for 24 hours. The resulting in-mold foamed molding article was evaluated or measured for the dropping off of the carbon black, compressive strength, dimensional stability, surface appearance, and color uniformity. The results are shown in Table 2.

TABLE 2

|  |  |  |  | Comparative Example ||||||
|---|---|---|---|---|---|---|---|---|---|
|  |  |  |  | 1 | 2 | 3 | 4 | 5 | 6 |
| Polypropylene-based resin composition | Polypropylene-based resin | Polypropylene-based resin A | Parts by weight | 100 | 100 | 100 |  |  |  |
|  |  | Polypropylene-based resin B | Parts by weight |  |  |  |  |  |  |
|  |  | Polypropylene-based resin C | Parts by weight |  |  |  |  |  |  |
|  |  | Polypropylene-based resin D | Parts by weight |  |  |  | 100 | 100 |  |
|  |  | Polypropylene-based resin E | Parts by weight |  |  |  |  |  | 100 |
|  | Conductive carbon black | Carbon black A | Parts by weight | 17.6 | 17.6 | 17.6 | 24.4 |  | 17.6 |
|  |  | Carbon black B | Parts by weight |  |  |  |  | 24.4 |  |
|  | Water-soluble organic substance | Polyethylene glycol | Parts by weight | 0.24 | 0.59 | 0.94 | 0.62 | 0.62 | 0.59 |
|  |  | Melamine | Parts by weight |  |  |  |  |  |  |
|  |  | Stearyl diethanolamine | Parts by weight |  |  |  |  |  |  |
|  | Water-soluble inorganic substance | Zinc borate | Parts by weight |  |  |  |  |  |  |
|  | Melting point |  | ° C. | 144 | 144 | 144 | 151 | 153 | 160 |
|  | Difference ΔT between melting point and crystal melting start temperature |  | ° C. | 60 | 60 | 60 | 48 | 49 | 44 |
|  | Rate of occupancy by endothermic area in the range of not higher than 115° C. in DSC measurement |  | % | 8.9 | 8.9 | 8.9 | 3.7 | 2.0 | 0.0 |
| Conductive polypropylene-based first-step foamed resin particles | First-step foaming conditions | Initially added amount of carbon dioxide | Parts by weight | 6.0 | 6.0 | 6.0 | 6.0 | 6.0 | 6.0 |
|  |  | Foaming temperature | ° C. | 146 | 146 | 147 | 151 | 154 | 161 |
|  |  | Foaming pressure (gauge pressure) | MPa | 3.2 | 3.0 | 2.7 | 3.0 | 3.0 | 3.5 |
|  | First-step foamed particles | Expansion ratio | Times | 13 | 13 | 13 | 14 | 13 | 13 |
|  |  | Cell diameter | — | ○ | ○ | ○ | ○ | ○ | X |
|  |  | Cell diameter uniformity | — | ○ | ○ | ○ | ○ | ○ | ○ |
|  |  | Rate of decrease of internal pressure | — | ⊙ | ⊙ | ⊙ | ○ | ○ | Δ |
|  |  | Foamed particle internal pressure (absolute pressure) | MPa | 0.2 | 0.2 | 0.2 | 0.2 | 0.2 | 0.2 |
|  | In-mold foam molding conditions | Steam pressure (gauge pressure) | MPa | 0.3 | 0.3 | 0.3 | 0.3 | 0.3 | 0.3 |
|  | In-mold foamed molding article | Dropping off of carbon black | — | X | X | X | ○ | ○ | X |
|  |  | Compressive strength | — | ○ | ○ | ○ | ○ | ○ | ○ |
|  |  | Dimensional stability | — | ○ | ○ | ○ | ○ | ○ | X |
|  |  | Surface appearance | — | ○ | ○ | ○ | ○ | ○ | Δ |
|  |  | Color uniformity | — | ○ | ○ | ○ | ○ | ○ | ○ |
| Conductive polypropylene secondary expanded resin particles | Secondary expansion conditions | Expanded particle internal pressure (absolute pressure) | MPa | 0.26 | 0.28 | 0.25 | 0.32 | 0.36 | 0.45 |
|  |  | Steam pressure (gauge pressure) | MPa | 0.07 | 0.05 | 0.08 | 0.13 | 0.13 | 0.19 |
|  | Secondary expanded particles | Expansion ratio | — | 18 | 18 | 18 | 18 | 18 | 18 |
|  |  | Cell diameter | — | ○ | ○ | ○ | ○ | ○ | X |
|  |  | Cell diameter uniformity | — | ○ | ○ | ○ | ○ | ○ | X |

TABLE 2-continued

| | | | | | | | | | |
|---|---|---|---|---|---|---|---|---|---|
| | | Rate of decrease of internal pressure | — | ○ | ○ | ○ | X | X | X |
| In-mold foamed molding conditions | | Expanded particle internal pressure (absolute pressure) | MPa | 0.2 | 0.2 | 0.2 | 0.2 | 0.2 | 0.2 |
| | | Steam pressure (gauge pressure) | MPa | 0.3 | 0.3 | 0.3 | 0.3 | 0.3 | 0.4 |
| In-mold foamed molding article | | Dropping off of carbon black | — | X | X | X | ○ | ○ | X |
| | | Compressive strength | — | ○ | ○ | ○ | X | X | ○ |
| | | Dimensional stability | — | ○ | ○ | ○ | Δ | Δ | Δ |
| | | Surface appearance | — | ○ | ○ | ○ | ○ | ○ | Δ |
| | | Color uniformity | — | ○ | ○ | ○ | ○ | ○ | ○ |

| | | | | Comparative Example | | | | |
|---|---|---|---|---|---|---|---|---|
| | | | | 7 | 8 | 9 | 10 | 11 |
| Polypropylene-based resin composition | Polypropylene-based resin | Polypropylene-based resin A | Parts by weight | | | | | |
| | | Polypropylene-based resin B | Parts by weight | 100 | 100 | | 100 | 100 |
| | | Polypropylene-based resin C | Parts by weight | | | 100 | | |
| | | Polypropylene-based resin D | Parts by weight | | | | | |
| | | Polypropylene-based resin E | Parts by weight | | | | | |
| | Conductive carbon black | Carbon black A | Parts by weight | 17.6 | 25 | 24.4 | 17.6 | 17.6 |
| | | Carbon black B | Parts by weight | | | | | |
| | Water-soluble organic substance | Polyethylene glycol | Parts by weight | | | | 0.06 | 3.53 |
| | | Melamine | Parts by weight | | | | | |
| | | Stearyl diethanolamine | Parts by weight | | | | | |
| | Water-soluble inorganic substance | Zinc borate | Parts by weight | 0.24 | 0.25 | 0.25 | | |
| | Melting point | | ° C. | 149 | 149 | 147 | 149 | 147 |
| | Difference ΔT between melting point and crystal melting start temperature | | ° C. | 58 | 54 | 56 | 55 | 53 |
| | Rate of occupancy by endothermic area in the range of not higher than 115° C. in DSC measurement | | % | 6.0 | 6.1 | 7.9 | 5.9 | 6.5 |
| Conductive polypropylene-based first-step foamed resin particles | First-step foaming conditions | Initially added amount of carbon dioxide | Parts by weight | 6.0 | 6.0 | 6.0 | 6.0 | 6.0 |
| | | Foaming temperature | ° C. | 150 | 151 | 149 | 151 | 151 |
| | | Foaming pressure (gauge pressure) | MPa | 3.6 | 3.5 | 3.6 | 3.4 | 2.5 |
| | First-step foamed particles | Expansion ratio | Times | 13 | 13 | 13 | 13 | 13 |
| | | Cell diameter | — | Δ | X | X | Δ | ○ |
| | | Cell diameter uniformity | — | ○ | ○ | ○ | X | ○ |
| | | Rate of decrease of internal pressure | — | ○ | ○ | Δ | ⊙ | ⊙ |
| | | Foamed particle internal pressure (absolute pressure) | MPa | 0.2 | 0.2 | 0.2 | 0.2 | 0.2 |
| | In-mold foam molding conditions | Steam pressure (gauge pressure) | MPa | 0.3 | 0.3 | 0.3 | 0.3 | 0.3 |
| | In-mold foamed molding article | Dropping off of carbon black | — | X | X | X | Δ | ○ |
| | | Compressive strength | — | ○ | ○ | ○ | ○ | — |
| | | Dimensional stability | — | ○ | ○ | ○ | ○ | ○ |

TABLE 2-continued

| | | | | | | | | |
|---|---|---|---|---|---|---|---|---|
| Conductive polypropylene secondary expanded resin particles | Secondary expansion conditions | Surface appearance | — | ○ | ○ | ○ | ○ | Δ |
| | | Color uniformity | — | ○ | ○ | ○ | ○ | ○ |
| | | Expanded particle internal pressure (absolute pressure) | MPa | 0.34 | 0.35 | 0.33 | 0.32 | — |
| | | Steam pressure (gauge pressure) | MPa | 0.13 | 0.13 | 0.14 | 0.12 | — |
| | Secondary expanded particles | Expansion ratio | — | 18 | 18 | 18 | 18 | — |
| | | Cell diameter | — | ○ | Δ | Δ | ○ | — |
| | | Cell diameter uniformity | — | ○ | ○ | ○ | ○ | — |
| | | Rate of decrease of internal pressure | — | Δ | Δ | ○ | ○ | — |
| | In-mold foamed molding conditions | Expanded particle internal pressure (absolute pressure) | MPa | 0.2 | 0.2 | 0.2 | 0.2 | — |
| | | Steam pressure (gauge pressure) | MPa | 0.3 | 0.3 | 0.3 | 0.3 | — |
| | In-mold foamed molding article | Dropping off of carbon black | — | X | X | X | Δ | — |
| | | Compressive strength | — | ○ | ○ | ○ | ○ | — |
| | | Dimensional stability | — | ○ | ○ | ○ | ○ | — |
| | | Surface appearance | — | ○ | ○ | ○ | ○ | — |
| | | Color uniformity | — | ○ | ○ | ○ | ○ | — |

The results in Table 1 show that in-mold foamed molding articles were successfully formed in Examples 1 to 9 by foaming the resulting conductive polypropylene-based resin particles and then subjecting the resulting first-step foamed particles and secondary expanded particles to in-mold foamed molding. Although slight variations in cell size were observed in Example 8, it is apparent that all in-mold foamed molding articles obtained through first-step foaming and secondary expansion in Examples 1 to 9 have excellent less-contamination properties while preventing the carbon black from dropping off, have a high level of compressive strength, dimensional stability, surface appearance, and color uniformity, and thus have good moldability. This is because all the resin compositions used in Examples 1 to 9 contain 17.6 parts by weight or more and less than 33.4 parts by weight of conductive carbon black and 0.1 parts by weight or more and 3.0 parts by weight or less of a water-soluble organic substance based on 100 parts by weight of a polypropylene-based resin, have a melting point Tm of 145° C. or more and 155° C. or les as measured by the DSC method, and have a temperature difference ΔT of 50° C. or more between the melting point Tm and the crystal melting start temperature Tl in the DSC curve.

On the other hand, the results in Table 2 show that in-mold foamed molding articles were formed by subjecting, to in-mold foamed molding, the first-step foamed particles and secondary expanded particles obtained by foaming and expanding the conductive polypropylene-based resin particles obtained in Comparative Examples 1 to 10.

However, in Comparative Examples 1 to 3 where the polypropylene-based resin compositions had a melting point lower than 145° C., carbon black significantly dropped off from the in-mold foamed molding articles obtained from the first-step foamed particles and the secondary expanded particles.

In Comparative Examples 4 and 5, the polypropylene-based resin compositions had a temperature difference of less than 50° C. between the melting point and the crystal melting start temperature, and a rate of occupancy of less than 5% by the endothermic area in the range of not higher than 115° C. in the DSC measurement. This reduced the foaming power of the foamed particles. The in-mold foamed molding article obtained from secondary expanded particles had a low compressive strength and was evaluated as having low dimensional stability.

In Comparative Example 6, the polypropylene-based resin composition had (i) a melting point of more than 155° C., (ii) a temperature difference of less than 50° C. between the melting point and the crystal melting start temperature, and (iii) a rate of occupancy of less than 5% by the endothermic area in the range of not higher than 115° C. in the DSC measurement, thereby affecting the cell diameter and foaming power of the first-step foamed particles and secondary expanded particles. This caused carbon black to significantly drop off from the in-mold foamed molding articles obtained from first-step foamed particles and secondary expanded particles, and also caused the in-mold foamed molding articles to be evaluated as having a low level of dimensional stability and surface appearance.

In Comparative Examples 7 to 9 where a water-soluble inorganic substance was used instead of the water-soluble organic substance, carbon black significantly dropped off from the in-mold foamed molding articles obtained from first-step foamed particles and secondary expanded particles.

In Comparative Examples 10 and 11, the content of the water-soluble organic substance was beyond the range of 0.1% by weight to 3.0% by weight. Therefore, in Comparative Example 10, dropping off of carbon black was observed, and in Comparative Example 11, the secondary expansion and the later process were not performed because the problem of the shrinkage of foamed particles occurred due to the high water content of the first-step foamed particles.

Although the disclosure has been described with respect to only a limited number of embodiments, those skilled in the art, having benefit of this disclosure, will appreciate that various other embodiments may be devised without departing from the scope of the present invention. Accordingly, the scope of the present invention should be limited only by the attached claims.

What is claimed is:

1. Conductive polypropylene-based foamed resin particles comprising a resin composition, wherein the resin composition comprises:
    100 parts by weight of a polypropylene-based resin;
    25 parts by weight to 33.4 parts by weight of conductive carbon black; and
    0.1 parts by weight to 3.0 parts by weight of a water-soluble organic substance,
    wherein the resin composition has a melting point (Tm) of 145° C. to 155° C. as measured by a differential scanning calorimetry (DSC) method, and has a temperature difference (ΔT) of 50° C. or more between the melting point (Tm) and a crystal melting start temperature (Tl) in a differential scanning calorimetry (DSC) curve, and
    wherein the DSC curve of the resin composition has an endothermic area in a range of 115° C. or less that occupies 5% to 7.9% of a total endothermic peak calorific area (Q).

2. The conductive polypropylene-based foamed resin particles according to claim 1, wherein the water-soluble organic substance is polyethylene glycol.

3. The conductive polypropylene-based foamed resin particles according to claim 1, wherein the water-soluble organic substance is melamine.

4. The conductive polypropylene-based foamed resin particles according to claim 1, wherein the water-soluble organic substance is stearyl diethanolamine.

5. A conductive polypropylene-based resin in-mold foamed molding article produced by fusing the conductive polypropylene-based foamed resin particles according to claim 1.

6. A method for producing conductive polypropylene-based foamed resin particles, the method comprising a first-step foaming process comprising:
    placing polypropylene-based resin particles, water, and a foaming agent in a pressure-resistant container to form, having an internal pressure, a dispersion under stirring conditions;
    heating the dispersion to a temperature equal to or greater than a softening point of the polypropylene-based resin particles; and
    discharging the dispersion from the pressure-resistant container to a region at a pressure lower than the internal pressure in the pressure-resistant container to foam the polypropylene-based resin particles, producing polypropylene-based foamed resin particles,
    wherein the polypropylene-based foamed resin particles are conductive polypropylene-based resin particles comprising a resin composition that contains 100 parts by weight of a polypropylene-based resin, 25 parts by weight to 33.4 parts by weight of conductive carbon black, and 0.1 parts by weight to 3.0 parts by weight of a water-soluble organic substance,
    wherein the resin composition has a melting point (Tm) of 145° C. to 155° C. as measured by a differential scanning calorimetry (DSC) method, and a temperature difference (ΔT) of 50° C. or more between the melting point (Tm) and a crystal melting start temperature (Tl) in a differential scanning calorimetry (DSC) curve, and
    wherein the DSC curve of the resin composition has an endothermic area in a range of 115° C. or less that occupies 5% to 7.9% of a total endothermic peak calorific area (Q).

7. The method according to claim 6, comprising a secondary expansion process comprising:
    applying an internal pressure to the polypropylene-based foamed resin particles obtained by the first-step foaming process; and then
    expanding the polypropylene-based foamed resin particles by heating with steam.

* * * * *